(12) United States Patent
Nielsen et al.

(10) Patent No.: US 7,676,540 B2
(45) Date of Patent: Mar. 9, 2010

(54) SCOPED REFERRAL STATEMENTS

(75) Inventors: Henrik F. Nielsen, Seattle, WA (US); Christopher G. Kaler, Sammamish, WA (US); Steven E. Lucco, Bellevue, WA (US); David E. Levin, Redmond, WA (US); Erik B. Christensen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1193 days.

(21) Appl. No.: 10/270,442

(22) Filed: Oct. 15, 2002

(65) Prior Publication Data

US 2003/0074357 A1    Apr. 17, 2003

Related U.S. Application Data

(60) Provisional application No. 60/371,155, filed on Apr. 10, 2002, provisional application No. 60/346,370, filed on Oct. 19, 2001, provisional application No. 60/329,796, filed on Oct. 16, 2001.

(51) Int. Cl.
*G06F 15/16* (2006.01)

(52) U.S. Cl. ............... 709/203; 709/217; 709/224; 707/10

(58) Field of Classification Search .......... 709/203, 709/217, 219, 223, 224; 707/1, 3, 10
See application file for complete search history.

(56) References Cited

U.S. PATENT DOCUMENTS

| | | | |
|---|---|---|---|
| 4,953,210 A | 8/1990 | McGlynn |
| 5,067,104 A | 11/1991 | Krishnakumar |
| 5,224,098 A | 6/1993 | Bird |
| 5,438,508 A | 8/1995 | Wyman |
| 5,499,343 A | 3/1996 | Pettus |
| 5,509,000 A | 4/1996 | Oberlander |
| 5,608,551 A | 3/1997 | Biles |
| 5,680,551 A | 10/1997 | Martino |
| 5,761,477 A | 6/1998 | Wahbe |

(Continued)

FOREIGN PATENT DOCUMENTS

EP        0715246        6/1996

(Continued)

OTHER PUBLICATIONS

Samjani, "Mobile Internet Protocol", IEEE Potentials, vol. 20, No. 1, Feb.-Mar. 2001, pp. 16-18.

(Continued)

*Primary Examiner*—Lashonda T Jacobs
(74) *Attorney, Agent, or Firm*—Workman Nydegger

(57) ABSTRACT

Methods, systems, and data structures for communicating object metadata are provided. A generic metadata container is presented that allows object metadata to be described in an extensible manner using protocol-neutral and platform-independent methodologies. A metadata scope refers to a dynamic universe of targets to which the included metadata statements correspond. Metadata properties provide a mechanism to describe the metadata itself, and metadata security can be used to ensure authentic metadata is sent and received. Mechanisms are also provided to allow refinement and replacement of metadata statements. The metadata container may be used to convey referral data to update routing tables in network nodes, and may also be used register referral statements and query a node for referral information.

27 Claims, 10 Drawing Sheets

U.S. PATENT DOCUMENTS

| | | | |
|---|---|---|---|
| 5,862,411 A | 1/1999 | Kay |
| 5,903,882 A | 5/1999 | Asay |
| 5,917,912 A | 6/1999 | Ginter |
| 5,935,219 A | 8/1999 | Holmes |
| 5,968,176 A | 10/1999 | Nessett |
| 5,974,416 A | 10/1999 | Anand |
| 5,978,836 A | 11/1999 | Ouchi |
| 6,006,259 A | 12/1999 | Adelman |
| 6,026,441 A | 2/2000 | Ronen |
| 6,047,324 A | 4/2000 | Ford |
| 6,119,171 A | 9/2000 | Alkhatib |
| 6,122,363 A | 9/2000 | Friedlander |
| 6,144,961 A | 11/2000 | De La Salle |
| 6,151,618 A | 11/2000 | Wahbe |
| 6,158,010 A | 12/2000 | Moriconi |
| 6,167,513 A | 12/2000 | Inoue |
| 6,199,112 B1 | 3/2001 | Wilson |
| 6,209,124 B1 | 3/2001 | Vermeire |
| 6,216,231 B1 | 4/2001 | Stubblebine |
| 6,219,790 B1 | 4/2001 | Lloyd |
| 6,223,619 B1 | 5/2001 | Shibata |
| 6,233,619 B1 | 5/2001 | Narisi |
| 6,243,749 B1 | 6/2001 | Sitaraman |
| 6,304,913 B1 | 10/2001 | Rune |
| 6,351,748 B1 | 2/2002 | Deen |
| 6,356,920 B1 | 3/2002 | Vandersluis |
| 6,393,456 B1 | 5/2002 | Ambler |
| 6,405,212 B1 | 6/2002 | Samu |
| 6,405,337 B1 | 6/2002 | Grohn |
| 6,408,342 B1 | 6/2002 | Moore |
| 6,446,113 B1 | 9/2002 | Ozzie |
| 6,449,638 B1 | 9/2002 | Wecke |
| 6,453,356 B1 | 9/2002 | Sheard |
| 6,466,971 B1 | 10/2002 | Humpleman |
| 6,477,580 B1 | 11/2002 | Bowman-Amuah |
| 6,496,849 B1 | 12/2002 | Hanson |
| 6,505,233 B1 | 1/2003 | Hanson |
| 6,505,254 B1 | 1/2003 | Johnson |
| 6,507,823 B1 | 1/2003 | Nel |
| 6,507,865 B1 | 1/2003 | Hanson |
| 6,522,631 B2 | 2/2003 | Rosborough |
| 6,523,063 B1 | 2/2003 | Miller |
| 6,532,213 B1 | 3/2003 | Chiussi |
| 6,532,455 B1 | 3/2003 | Martin |
| 6,546,419 B1 | 4/2003 | Humpleman |
| 6,571,236 B1 | 5/2003 | Ruppelt |
| 6,578,066 B1 | 6/2003 | Logan |
| 6,601,171 B1 | 7/2003 | Carter |
| 6,601,189 B1 | 7/2003 | Edwards |
| 6,615,258 B1 | 9/2003 | Barry |
| 6,618,825 B1 | 9/2003 | Shaw |
| 6,654,344 B1 | 11/2003 | Toporek |
| 6,665,657 B1 | 12/2003 | Dibachi |
| 6,667,974 B1 | 12/2003 | Shigeta |
| 6,675,261 B2 | 1/2004 | Shandony |
| 6,678,827 B1 | 1/2004 | Rothermel |
| 6,724,726 B1 | 4/2004 | Coudreuse |
| 6,728,767 B1 | 4/2004 | Day |
| 6,742,114 B1 | 5/2004 | Carter |
| 6,745,197 B2 * | 6/2004 | McDonald ................. 707/102 |
| 6,748,453 B2 | 6/2004 | Law |
| 6,751,562 B1 | 6/2004 | Blackett |
| 6,763,040 B1 | 7/2004 | Hite |
| 6,782,414 B1 | 8/2004 | Xue |
| 6,782,542 B1 * | 8/2004 | Mein et al. ................. 719/330 |
| 6,789,118 B1 | 9/2004 | Rao |
| 6,850,893 B2 | 2/2005 | Lipkin |
| 6,850,979 B1 | 2/2005 | Saulpaugh |
| 6,851,054 B2 | 2/2005 | Wheeler |
| 6,873,975 B1 | 3/2005 | Hatakeyama |
| 6,891,953 B1 | 5/2005 | DeMello |
| 6,920,558 B2 | 7/2005 | Sames |
| 6,928,442 B2 | 8/2005 | Farber |
| 6,970,935 B1 | 11/2005 | Maes |
| 6,976,074 B2 | 12/2005 | Cabrera |
| 6,990,585 B2 | 1/2006 | Maruyama |
| 7,051,339 B2 | 5/2006 | Deverill |
| 7,055,143 B2 * | 5/2006 | Ringseth et al. ............. 717/143 |
| 7,065,706 B1 * | 6/2006 | Sankar ....................... 715/234 |
| 7,127,511 B2 | 10/2006 | Tonouchi |
| 7,149,802 B2 | 12/2006 | Cabrera |
| 7,194,553 B2 | 3/2007 | Lucco |
| 7,257,817 B2 | 8/2007 | Cabrera |
| 7,293,283 B2 | 11/2007 | Kaler |
| 7,409,367 B2 | 8/2008 | McGill |
| 7,418,457 B2 | 8/2008 | Kaler |
| 7,451,157 B2 | 11/2008 | Kaler |
| 7,453,875 B2 * | 11/2008 | Vernal et al. ................. 370/389 |
| 2001/0009018 A1 | 7/2001 | Iizuka |
| 2002/0002581 A1 | 1/2002 | Siddiqui |
| 2002/0078233 A1 | 6/2002 | Biliris |
| 2002/0126701 A1 | 9/2002 | Requena |
| 2002/0138582 A1 | 9/2002 | Chandra |
| 2002/0143984 A1 | 10/2002 | Hudson |
| 2002/0152214 A1 | 10/2002 | Muntz |
| 2002/0157004 A1 | 10/2002 | Smith |
| 2002/0169781 A1 | 11/2002 | Poole |
| 2002/0174178 A1 | 11/2002 | Stawikowski |
| 2002/0178103 A1 | 11/2002 | Dan |
| 2002/0184319 A1 * | 12/2002 | Willner et al. ............. 709/206 |
| 2002/0188638 A1 | 12/2002 | Hamscher |
| 2003/0041178 A1 | 2/2003 | Brouk |
| 2003/0050966 A1 * | 3/2003 | Dutta et al. ................ 709/203 |
| 2003/0065942 A1 | 4/2003 | Lineman |
| 2003/0074367 A1 | 4/2003 | Kaler |
| 2003/0074413 A1 * | 4/2003 | Nielsen et al. ............. 709/206 |
| 2003/0074482 A1 | 4/2003 | Christensen |
| 2003/0074579 A1 | 4/2003 | Della-Libera |
| 2003/0093678 A1 | 5/2003 | Bowe |
| 2003/0120593 A1 | 6/2003 | Bansal |
| 2003/0159059 A1 | 8/2003 | Rodriquez |
| 2004/0088585 A1 | 5/2004 | Kaler |
| 2005/0138353 A1 | 6/2005 | Spies |
| 2005/0278390 A1 | 12/2005 | Kaler |
| 2006/0041743 A1 | 2/2006 | Della-Libera |
| 2006/0041929 A1 | 2/2006 | Della-Libera |
| 2006/0212599 A1 | 9/2006 | Lucco |
| 2006/0253699 A1 | 11/2006 | Della-Libera |
| 2006/0253700 A1 | 11/2006 | Della-Libera |
| 2008/0141028 A1 | 6/2008 | Wei |
| 2008/0263166 A1 * | 10/2008 | Beigi et al. ................. 709/206 |
| 2009/0046726 A1 | 2/2009 | Cabrera |

FOREIGN PATENT DOCUMENTS

| | | |
|---|---|---|
| EP | 1003308 | 5/2000 |
| EP | 1024627 | 8/2000 |
| EP | 1118925 | 7/2007 |
| JP | 7141296 | 6/1995 |
| JP | 11328033 | 11/1999 |
| JP | 2000083049 | 3/2000 |
| JP | 2000253066 | 9/2000 |
| JP | 2000516406 | 12/2000 |
| JP | 2000516407 | 12/2000 |
| JP | 2002507295 | 5/2002 |
| WO | 9534972 | 12/1995 |
| WO | 9854644 | 12/1998 |
| WO | 9937066 | 7/1999 |
| WO | 0004458 | 1/2000 |
| WO | 0008909 | 2/2000 |
| WO | 0042748 | 7/2000 |
| WO | 0146783 | 6/2001 |
| WO | 0152496 | 7/2001 |
| WO | 0158108 | 8/2001 |

| WO | 2007073609 | 7/2007 |

OTHER PUBLICATIONS

"IP Routing Policies and Filters", printed from http://support.baynetworks.com/library/tpubs/html/switches/bstream/115401A/L_17.HTM on Sep. 26, 2002.
K. Swaminathan, "Negotiated Access Control", Proceedings of the 1985 Symposium on Security and Privacy: Apr. 22-24, 1985, pp. 190-196.
W. LeFebvre "Permissions And Access Control Lists", Performance Computing, vol. 16, No. 11, Oct. 1998, pp. 59-61.
B. Dunkel et al., "Customized Metadata for Internet Information", 1997 First International Conference on Knowledge-Based Intelligent Electronic Systems: Proceedings, vol. 2, May 21-23, 1997, pp. 508-516.
U. Srinvasan et al., "Managing Heterogeneous Information Systems through Discovery and Retrieval of Generic Concepts", Journal of the American Society for Information Science, vol. 51, No. 8, Jun. 2000, pp. 707-723.
J. Martinez et al., "MPEG-7 The Generic Multimedia Content Description Standard, Part 1", vol. 9, No. 2, Apr.-Jun. 2002, pp. 78-87.
C. Süβ et al., "Meta-modeling for Web-Based Teachware Management", Advances in Conceptual Modeling: ER'99 Workshops on Evolution and Change in Data Management, Reverse Engineering In Information Systems, and the World Wide Web and Conceptual Modeling, 1999, pp. 360-373.
K. Lang et al., "XML, metadata and efficient knowledge discovery", Knowledge-Based Systems, vol. 13, No. 5, Oct. 2000, pp. 321-331.
T. Baker, "A Multilingual Registry for Dublin Core Elements and Qualifiers", ZfBB 47, 2000, pp. 14-19.
J. Moy, OSPF Version 2, Networking Working Group, RFC 2328, Ascend Communications, Inc., Apr. 1998, pp. 1-204.
J. Moy, OSPF Version 2, Networking Working Group, RFC 1247, Proteon, Inc., Jul. 1991, pp. 1-177.
SOAP Security Extensions: Digital Signature, W3C NOTE Feb. 6, 2001, http://www.w3.org/TR/2001/NOTE-SOAP-dsig-20010206/.
IP Encapsulating Security Payload (ESP), Ipsec Working Group, Internet Draft, Draft-ietf-ipsec-esp-v3-03.txt, Expires Jan. 2003. S. Kent, BBN Technologies, Jul. 2002.
Mark Bartel et al., "XML — Signature Syntak and Processing", Aug. 20, 2001, 60 pages, http://www.w3.org/TR/2001/PR-xmldsig-core-20010820/.
Simon et al., "An Introduction to XML Digital Signatures", http://www.xml.com/pub/a/2001/08/08/xmldsig.html.
Kees Leune, Mike Papazoglou, Willem-Jan Van Den Heuvel, "Specification and Querying of Security Constraintss in the EFSOC Framwork", Nov. 2001, ICSOC '04: Proceedings of the 2nd International Conference on Service Oriented Computing, pp. 125-133.
Rotzal, Peter H., "X 400 Message Handling System: The Remote User Agent," Proceedings of the Military Communications Conference (MILCOM) Jun. 11, 1995, vol. 1, pp. 433-437.
European Search Report dated Jun. 28, 2006 (02023016.5), 6 pages.
Mourad, A. et al., "Scalable Web Server Architectures"; Proceeding IEEE International Symposium on Computer and Communications; Jul. 1, 1999; pp. 12-16, WP000199852.
Xinghuo Yu; Zhihong Man; "Finite *time* *output* Tracking Problem with Teminal Sliding Mode Control," Computational Engineering in Sytems Applications, Part vol. 1, pp. 28-31, vol. 1, Publisher: Gerf EC Lille - Cite Scientifique, Lille France.
Edge, S.W. "An Adaptive *timeout* Algorithm for Retransmission Across a Packet Switching Network", Computer Communication Review, vol. 14, No. 2, pp. 248-255, Published in USA.
Wallstrom, Bengt, " Queueing System with *Time* - *Outs* and Random Departures", Ericsson Technics, v 33 n 2 1977, pp. 151-174.
Diane Hillmann, "Using Dublin Core", Issued Jul. 16, 2000, pp. 1-10.
Structured Graph Format: XML Metadata for describing website structure, Liechi et al. pp. 11-21, Issued 1998.
Nikkei Network, No. 17, Sep. 2001, pp. 94-97.
"Windows NT TCP/IP Networking 9. DNS (Domain Name System)", Let's Start with TCP/IP, Dec. 31, 2000, pp. 156-159.
"Preliminary Knowledge for Managing a Website, Basic Knowledge of Domain Name," Basics of Creating a Website Which Can Be Understood With the Help of Illustration, Aug. 31, 2000, pp. 179-185.
Nikkei Network, No. 4, Aug. 2000, pp. 104-112.
Nikkei Byte, No. 211, Dec. 2000, pp. 176-181.
Nikkei Communications, No. 355, Feb. 5, 2001, pp. 106-113.
Nikkei Communications, No. 340, Apr. 16, 2001, pp. 216-217.
Herik F. Nielsen et al., "Direct Internet Message Encapsulation", May 23, 2001, 13 Pages.
Richard Bowers, "Apple's Free Internet Domain Name Server Software", Post-Newsweek Business Information, Inc., May 2, 1996, 1 page.
"TIBCO Rendezvous - a TIBCO Active Enterprise Product", http://www.tibco.com/products/rv/index.html, printed Dec. 10, 2001, 2 Pages.
"TIBCO Rendezvous TX - a TIBCO Active Enterprise Product", http://www.tibco.cim/products/rv/rvtx.html, Printed Dec. 10, 2001 2 Pages.
"TIBCO Enterprise for JMS", http://www.tibco.com/products/enterprise_for_jms.html, printed Dec. 10, 2001, 1 Page.
Henrik F. Nielsen et al., "SOAP Routing Protocol", http://www.gotdot.com/team/xml_wsspecs/soap-rp/default.html, May 23, 2001, 36 Pages.
G. Robert Malan et al., "An Extensible Probe Architecture for Network Protocol Performance Measurment", Department of Electrical Engineering and Computer Science, University of Michigan, SIGCOMM 1998, Vancouver, pp. 215-227.
Kunihiko Toumura et al., "Implementing Multiple Name Spaces Using An Active Network Technology", Jun. 2003, pp. 1665-1676.
David Potter et al., "Connecting minis to local nets with discrete modules", Data Communications, Jun. 1983, pp. 161-164.
Steven M Dean et al., "CONE: A Software Environment for Network Protocols", Hewlett-Packard Journal, Feb. 1990, pp. 18-28.
Fumiko Kouda et al., "Representation of Descriptive Name and the Resolution Method with a Semantic Network Structure", Journal of Information Processing, vol. 15, No. 2, 1992, pp. 280-292.
B. Ramsey, "An RTOS with its Nest is Pure Dynamite", Electronic Engineering Times Sep. 11, 1995, No. 865, p. 76, 3 Pages.
Conference paper, Proceedings - Twenty Third Annual International Computer Software and Applications Conference, Publication Date 1999, USA, Date Oct. 27-29, 1999.
Cantor, "The ICAAP Project 3 PSF Distributed Computing Environment", Journal - Library Hi Tech, vol. 15, No. 1-2, p. 79-83, Publication Date 1997, USA.
Simms, "Windows on the Internet", Journal - Wall Street & Technology, Suppl. Issue p. 16, 18-19, Publication Dated Fall 1997, USA —Abstract.
Doward, Pike, Presotto, Ritchie, Trickey, Winterbottom; "The Inferno /sup TM/ Operating System", Journal - Bell Labs Technical Journal, vol. 2, No. 1, p. 15-18 Publication Date, Winter, 1997, USA.
Benner, Russell, "Practical High-Impedance Fault Detection on Distribution Feeders", Journal - IEEE Transactions on Industry Applications, vo. 33, No. 3, p. 635-640, publication date May-Jun. 1997, USA.
Conference - Jones, "Computer Use Policies, the Challenge of Updating Lab Software Security", User Services Conference XXI Part vol. 1, pp. 222-224, vol. 1, Publication Date 1993, USA.
Udell, "LAN Manager 2.0: A Force to be Reckoned With" Journal - BYTE, vol. 15, No. 13, pp. 221-222, 224, 226, Publication Date Dec. 1990, USA.
Conference - Olson, Levine, Jones, Bodoff, Bertrand, "Proceedings of the Summer 1988 USENIX Conference", pp. 287-294, Publication date 1988, USA, Conference date Jun. 21-24, 1988 - San Francisco.
"XML Schema Part 0: Primer", W3C Proposed Recommendation, 30 Mar. 2001, 64 pages (Dec. 11, 2004).
CCIE Fundamentals: Network Design and Case Studies, Second Edition, by Cisco Systems, Inc. Publisher: Cisco Press, Publication Date: Oct. 19, 1999, Print ISBN - 10: 1-57870-167-8.
European Search Report - Application No. 02023017 - Oct. 6, 2005.
G. Bull et al., "Access Control Lists", printed from http://curty.edschool.virginia.edu/go/spinning/ACL_Permissions.html on Sep. 18, 2002, 5 pages.

Security in JDK 1.1, Access Control Abstractions, May 2, 1997, printed from http://java.sun.com/products/jdk/1.1/docs/guide/security/Acl.html, on Sep. 18, 2002, 4 pages.

T. Saito, et al. "Privacy Enhanced Access Control by SPKI", IEEE, 2000, pp. 301-306.

G. Fernandez et al., "Extending the UNIX Protection Model with Access Control Lists", Proceedings of the Summer 1998 USENIX Conference, Jun. 20-24, 1988, pp. 119-132.

A. Chander et al, "A State-Transition Model of Trust Management and Access Control", Proceedings 14th IEEE Computer Security Foundations Workshop, Jun. 11-13, 2001, pp. 27-43.

D. Wichers et al., "PACL's: An Access Control List Approach to Anti-Viral Security", Information Systems Security: Standards - The Key to the Future: 13th National Computer Security Conference, Oct. 1-4, 1990, pp. 340-349.

M. Benantar et al., "Use of DSOM Before/After Metaclass for Enabling Object Access Control", IRP/IEEE International Conference on Distributed Platforms: Client/Server and Beyond, 1996, pp. 73-85.

M. Koch et al., "Conflict Detection and Resolution in Access Control Policy Specifications"; FOSSACS 2002, pp. 223-237.

M. Calbucci, "Windows 2000 Security Descriptors", Dr. Dobb's Journal, vol. 25, No. 11, Nov. 2000, pp. 57-58,60,63,66.

J. Hwang, et al., "Access control with role attribute certificates", Computer Standards and Interfaces, vol. 22, No. 1, Mar. 2000, pp. 43-53.

J. Qian, et al., "ACLA: A Framework for Access Control List (ACL) Analysis and Optimization", IFIP TC6/TC11 Joint Working Conference on Cornmunications and Multimedia Security 5th, 2001, pp. 197-211.

Office Action Attached dated Oct. 4, 2005 cited in U.S. Appl. No. 10/068,444

Office Action Attached dated Mar. 31, 2006 cited in U.S. Appl. No. 10/068,444.

Office Action dated Oct. 13, 2006 cited in U.S. Appl. No. 10/068,444.

Office Action dated Jan. 26, 2009 cited in U.S. Appl. No. 11/422,106.

Office Action dated Nov. 17, 2003 cited in U.S. Appl. No. 10/219,898.

Office Action dated Apr. 21, 2004 cited in U.S. Appl. No. 10/219,898.

Office Action dated Oct. 6, 2004 cited in U.S. Appl. No. 10/219,898.

Office Action dated Oct. 26, 2006 cited in U.S. Appl. No. 10/219,898.

Office Action dated Mar. 26, 2007 cited in U.S. Appl. No. 10/219,898.

Office Action dated Aug. 15, 2007 cited in U.S. Appl. No. 10/219,898.

Office Action dated Mar. 22, 2007 cited in U.S. Appl. No. 10/693,290.

Office Action dated Sep. 20, 2007 cited in U.S. Appl. No. 10/693,290.

Office Action dated Mar. 28, 2008 cited in U.S. Appl. No. 10/693,290.

Notice of Allowance dated Oct. 15, 2008 cited in U.S. Appl. No. 10/693,290.

Office Action dated Jan. 7, 2005 cited in U.S. Appl. No. 09/983,555.

Office Action dated Jul. 7, 2005 cited in U.S. Appl. No. 09/983,555.

Office Action dated Mar. 23, 2006 cited in U.S. Appl. No. 09/983,555.

Office Action dated Sep. 11, 2006 cited in U.S. Appl. No. 09/983,555.

Office Action dated Sep. 21, 2004 cited in U.S. Appl. No. 09/993,656.

Office Action dated Dec. 23, 2004 cited in U.S. Appl. No. 09/993,656.

Office Action dated Nov. 29, 2005 cited in U.S. Appl. No. 09/993,656.

Notice of Allowance dated May 25, 2007 cited in Application No. 09/993,656

Office Action dated Dec. 30, 2004 cited in U.S. Appl. No. 09/983,539.

Office Action dated Jun. 17, 2005 cited in U.S. Appl. No. 09/983,539.

Office Action dated Jan. 18, 2006 cited in U.S. Appl. No. 09/983,539.

Notice of Allowance dated Jun. 27, 2005 cited in U.S. Appl. No. 10/007,060.

Office Action dated May 28, 2008 cited in U.S. Appl. No. 11/254,545.

Office Action dated May 28, 2008 cited in U.S. Appl. No. 11/254,539

Office Action dated Mar. 7, 2006 cited in U.S. Appl. No. 11/254,519.

Office Action dated Aug. 11, 2006 cited in U.S. Appl. No. 11/254,519.

Office Action dated Nov. 5, 2004 cited in U.S. Appl. No. 10/007,060.

Office Action dated May 11, 2005 cited in U.S. Appl. No. 10/007,060.

Notice of Allowance dated Jun. 27, 2005 cited in U.S. Appl. No. 10/007,060.

Office Action dated Jul. 20, 2005 cited in U.S. Appl. No. 10/999,837.

Office Action dated Dec. 21, 2005 cited in U.S. Appl. No. 10/999,837.

Office Action dated May 25, 2006 cited in U.S. Appl. No. 10/999,837

Office Action dated Sep. 18, 2006 cited in U.S. Appl. No. 10/999,837.

Office Action dated Nov. 26, 2008 cited in U.S. Appl. No. 11/254,545.

Office Action dated Nov. 28, 2008 cited in U.S. Appl. No. 11/254,539.

Office Action dated Mar. 23, 2006 cited in U.S. Appl. No. 11/254,264.

Office Action dated Aug. 11, 2006 cited in U.S. Appl. No. 11/254,264.

Office Action dated Mar. 7, 2007 cited in U.S. Appl. No. 11/254,264.

Office Action dated Aug. 7, 2006 cited in U.S. Appl. No. 11/254,264.

Office Action dated May 29, 2008 cited in U.S. Appl. No. 11/254,264.

Office Action dated Nov. 17, 2008 cited in U.S. Appl. No. 11/254,264.

Office Action dated Jul. 8, 2009 cited in U.S. Appl. No. 11/254,545.

Office Action dated Jul. 9, 2009 cited in Application No. 11/254,264.

Office Action dated Jul. 9, 2009 cited in Application No. 11/254,539.

Notice of Allowance dated Aug. 10, 2009 cited in U.S. Appl. No. 11/422,106.

Office Action dated Mar. 21, 2007 cited in U.S. Appl. No. 11/207,034.

Office Action dated Oct. 4, 2007 cited in U.S. Appl. No. 11/207,034.

Office Action dated May 28, 2008 cited in U.S. Appl. No. 11/207,034.

Office Action dated Dec. 5, 2008 cited in U.S. Appl. No. 11/207,034.

Office Action dated May 11, 2009 cited in U.S. Appl. No. 11/207,034.

Notice of Allowance dated Oct. 27, 2009 cited in U.S. Appl. No. 11/422,106.

* cited by examiner

```
<HTML>
<HEAD>
<META HTTP-EQUIV="CONTENT-TYPE" CONTENT="TEXT/HTML; CHARSET=ISO-8859-1" />
<TITLE>MICROSOFT CORPORATION -- WHERE DO YOU WANT TO GO TODAY?</TITLE>
<META HTTP-EQUIV="PICS-LABEL" CONTENT="(PICS-1.1 "HTTP://WWW.RSAC.ORG/
RATINGSV01.HTML" L GEN TRUE R (N 0 S 0 V 0 L 0))" />
<META NAME="KEYWORDS" CONTENT="PRODUCTS; HEADLINES; DOWNLOADS; NEWS; WEB SITE;
WHAT'S NEW; SOLUTIONS; SERVICES; SOFTWARE; CONTESTS; CORPORATE NEWS;" />
<META NAME="DESCRIPTION" CONTENT="THE ENTRY PAGE TO MICROSOFT'S WEB SITE. FIND
SOFTWARE, SOLUTIONS AND ANSWERS. SUPPORT, AND MICROSOFT NEWS." />
<META NAME="MS.LOCALE" CONTENT="EN-US" />
<META NAME="CATEGORY" CONTENT="HOME PAGE" />
...
</HEAD>
...
</HTML>
```

FIG. 1
PRIOR ART

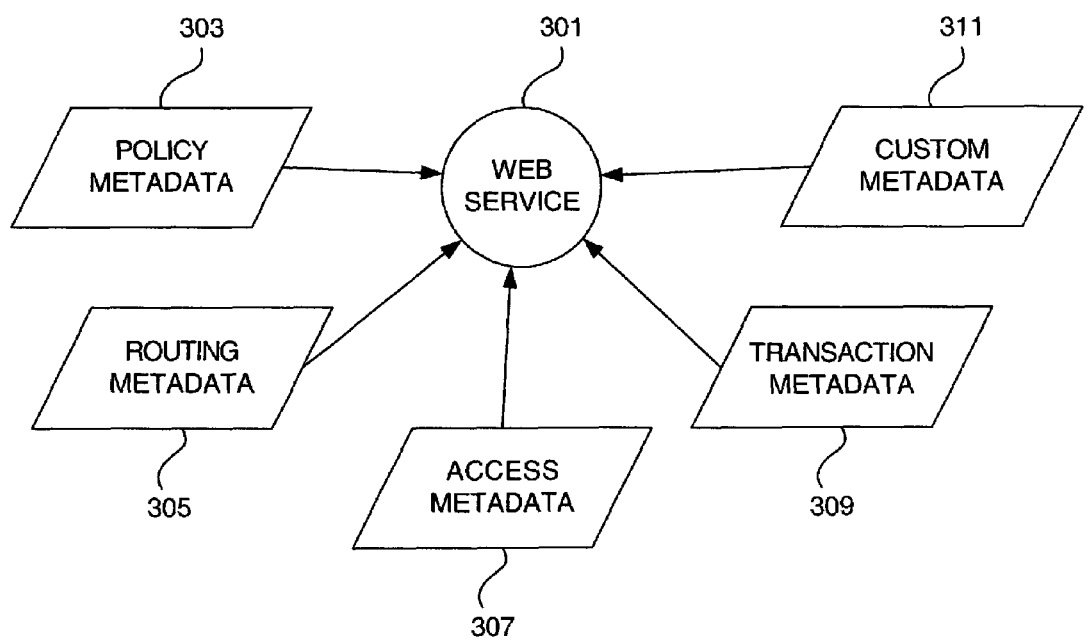

FIG. 3

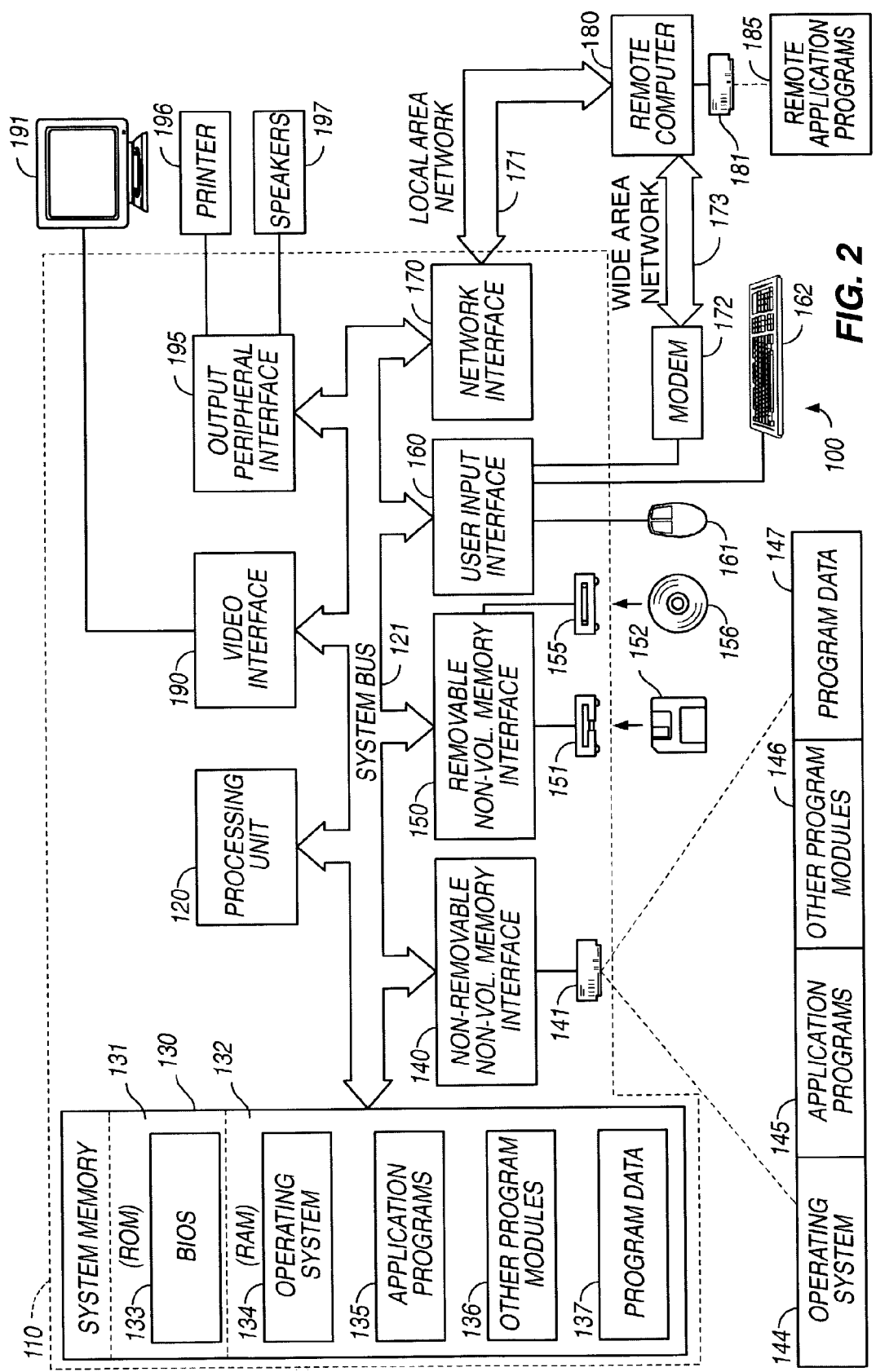

```
<METADATA>
    <SCOPE> HTTP://WWW.XYZCO.COM/MBOXSVC/ </SCOPE>
    <PROPERTIES>
        <EXPIRE>"10/15/2002"</EXPIRE>
        <AUTHOR>"RAD"</AUTHOR>
    </PROPERTIES>
    <STATEMENTS>
        <MAX_MSG_LEN>1024</MAX_MSG_LEN>
        <INCLUDE IDREF="COMMON_STATEMENTS"/>
    </STATEMENTS>
    <SECURITY>
        <SIGNATURE>"SKLH...SDN3"</SIGNATURE>
        <MD5HASH>"D41D...427E"</MD5HASH>
    </SECURITY>
</METADATA>
```

```
<r:ref xmlns:r="http://schemas.xmlsoap.org/ws/2001/10/referral">
  <r:for>
    <r:exact>soap://example.org/some.doc</r:exact>
    <r:prefix>soap://example.org/topics/icebergs</r:prefix>
  </r:for>
  <r:if>
    <r:ttl>43200000</r:ttl>
  </r:if>
  <r:go>
    <r:via>soap://example.com/mirror</r:via>
  </r:go>
  <r:refId>uuid:09233523-345b-4351-b623-5dsf35sgs5d6</r:refId>
  <r:desc>
    <r:refAddr>http://example.com/references/2001/10/1234.xml</r:refAddr>
  </r:desc>
</r:ref>
```

FIG. 10

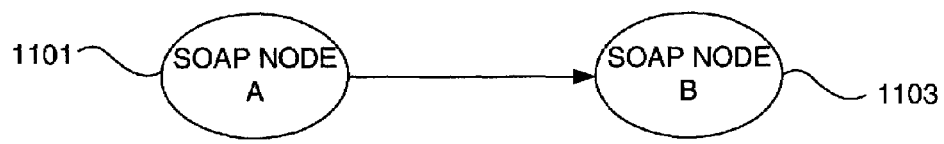

FIG. 11

```
<r:ref xmlns:r="http://schemas.xmlsoap.org/ws/2001/10/
referral">
  <r:for>
    <r:prefix>soap://b.org</r:prefix>
  </r:for>
  <r:if/>
  <r:go>
    <r:via>soap://c.org</r:via>
  </r:go>
  <r:refId>mid:1234@some.host.org</r:refId>
</r:ref>
```

FIG. 12

```
<r:ref xmlns:r="http://schemas.xmlsoap.org/ws/2001/10/referral">
  <r:for>
    <r:prefix>soap://b.org/some/part</r:prefix>
  </r:for>
  <r:if>
    <r:invalidates>
      <r:rid>mid:2345@some.host.org</r:rid>
    </r:invalidates>
  </r:if>
  <r:go/>
  <r:refId>mid:3456@some.host.org</r:refId>
</r:ref>
```

FIG. 16  1601

```
<r:query xmlns:r="http://schemas.xmlsoap.org/ws/2001/10/referral">
  <r:for>
    <r:prefix>soap://example.org/topics/icebergs</r:prefix>
  </r:for>
</r:query>
```

FIG. 17  1701

```
<r:queryResponse xmlns:r="http://schemas.xmlsoap.org/ws/2001/10/referral">
  <r:ref>
    <!-- statement left out for illustrative reasons -->
  </r:ref>
  <r:ref>
    <!-- statement left out for illustrative reasons -->
  </r:ref>
</r:queryResponse>
```

FIG. 18  1801

```
<S:Envelope xmlns:S="http://www.w3.org/2001/09/soap-envelope">
  <S:Header>
    <m:path xmlns:m="http://schemas.xmlsoap.org/rp/">
      <m:action>http://schemas.xmlsoap.org/ws/2001/10/referral#register</m:action>
      <m:to>soap://b.org</m:to>
      ...
      <m:id>mid:3000@c.org</m:id>
    </m:path>
  </S:Header>
  <S:Body>
    <r:register xmlns:r="http://schemas.xmlsoap.org/ws/2001/10/referral">
      <r:ref>
        <r:for>
          <r:prefix>soap://b.org/some/part</r:prefix>
        </r:for>
        <r:if/>
        <r:go>
          <r:via>soap://c.org/my/application</r:via>
        </r:go>
      </r:ref>
    </r:register>
  </S:Body>
</S:Envelope>
```

FIG. 19

```
<S:Envelope xmlns:S="http://www.w3.org/2001/09/soap-envelope">
  <S:Header>
    <m:path xmlns:m="http://schemas.xmlsoap.org/rp/">
      <m:action>http://schemas.xmlsoap.org/ws/2001/10/referral#registrationResponse</m:action>
      <m:to>soap://a.org</m:to>
      <m:id>mid:2001@b.org</m:id>
      <m:relatesTo>mid:3000@c.org</m:relatesTo>
    </m:path>
  </S:Header>
  <S:Body>
    <r:registrationResponse xmlns:r="http://schemas.xmlsoap.org/ws/2001/10/referral"/>
  </S:Body>
</S:Envelope>
```

FIG. 20

```
<S:Envelope xmlns:S="http://www.w3.org/2001/09/soap-envelope">
  <S:Header>
    <m:path xmlns:m="http://schemas.xmlsoap.org/rp/">
      <m:action>http://schemas.xmlsoap.org/ws/2001/10/
referral#registrationResponse</m:action>
      <m:to>soap://a.org</m:to>
      <m:id>mid:2002@b.org</m:id>
      <m:relatesTo>mid:1000@a.org</m:relatesTo>
    </m:path>
  </S:Header>
  <S:Body>
    <S:Fault xmlns:r="http://schemas.xmlsoap.org/ws/2001/10/referral">
      <faultcode>r:registrationFault</faultcode>
      <faultstring>Registration Fault</faultstring>
      <detail>
        <r:maxTtl>36000000</r:maxTtl>
      </detail>
    </S:Fault>
  </S:Body>
</S:Envelope>
```
— 2103

```
<S:Envelope xmlns:S="http://www.w3.org/2001/09/soap-envelope">
  <S:Header>
    <r:referrals xmlns:r="http://schemas.xmlsoap.org/ws/2001/10/referral">
      <r:ref>
        <!-- insert referral statement here -->
      </r:ref>
      <r:ref>
        <!-- insert referral statement here -->
      </r:ref>
    </r:referrals>
  </S:Header>
  <S:Body>
    ...
  </S:Body>
</S:Envelope>
```
2203        2201

FIG. 22

SCOPED REFERRAL STATEMENTS

This application claims priority to provisional U.S. application Ser. Nos. 60/329,796 filed Oct. 16, 2001, 60/346,370 filed Oct. 19, 2001, and 60/371,155 filed on Apr. 10, 2002.

FIELD OF THE INVENTION

The invention relates generally to computer networks and message routing over computer networks. More specifically, the invention relates to methods and systems for providing and updating routing information in an extensible manner.

BACKGROUND OF THE INVENTION

Currently, much of the utility of computer systems lies in their ability to communicate and share information with other computer systems. Information is typically passed between computer systems via computer networks. Computer networks are groups of computers interconnected by wires or wireless mechanisms such as infrared, radio, and other technologies. The Internet is a global network of many smaller computer networks connected to one another. There is no controlling central network, but rather several high level networks that are connected through network access points. A network access point is a computer hardware or software device (commonly a network router) that serves as a kind of translator between two different networks.

Web services, generally, refers to application-to-application communication over the Internet via programmatic interfaces. For example, a local application (e.g., Microsoft® Money) on a client computer may communicate with a server application on a remote computer to obtain stock ticker information. The two applications may communicate the requested ticker symbol and the corresponding results via one or more messages transmitted over the Internet, without opening or using a traditional Internet browser such as Internet Explorer®.

The advent of XML (eXtensible Markup Language) and other protocol-neutral communications mechanisms has made it easier for web services to be offered between computers residing on different networks, written in different languages, and/or using different operating systems, yet still communicate effectively in an interoperable manner. However, these protocol neutral mechanisms do not provide an extensible mechanism to describe and update local configuration determining the appropriate message path for a message intended for a specific web service.

Routing protocols such as the Routing Information Protocol (RIP) and Interior Gateway Routing Protocol (IGRP) provide router table update mechanisms. However, these protocols are not compatible for use with web services, e.g., using Simple Object Access Protocol (SOAP). In addition, RIP and IGRP are distance-based routing protocols that always route data based on a calculated shortest distance. RIP and IGRP are concerned with how to route a message at the IP layer, not how to update routing information in a router for use by an application at the application layer. Protocols such as BGP and EGP also are primarily directed to how to route messages, not how to update information in routing tables.

Another known routing protocol, Open Shortest Path First (OSPF), is a link-state routing protocol, which bases changes on the status and speeds of the physical links of the networked routers, and propagates the changes to every router on the network. When first initialized (e.g., powered on), an OSPF router uses a protocol termed a "hello protocol" to discover neighbors to which the router is connected. The router then exchanges link-state information with these routers. Using the link-state information, each router creates a database that includes of every interface, its corresponding neighbor and a metric representing the speed of that interface. Each router then passes this information along to all neighboring routers. The process is repeated in turn until every router in the network receives link state information for every other router in the network. Each router builds a tree indicating a path to every node on the network, using itself as the root. The tree is then used to create a routing table, which the router then uses to route messages in the network. OSPF, however, does not provide for updating routing tables with routing information other than that corresponding to a directly linked interface or router, nor does it provide for updating with information other than link-state information. Other limitations as with RIP and IGRP, described above, also apply to OSPF.

Thus, it would be an advancement in the art to provide a mechanism for describing exchange and deployment of message path configuration information in an extensible manner. It would be a further advancement in the art to allow message path configuration information to refer to multiple resources simultaneously. It would be a further advancement in the art to provide a message path configuration information mechanism that allows routing metadata statements to be refined by subsequent message path configuration information statements. It would be a further advancement in the art to provide a routing table update protocol that is compatible with platform-independent web services.

BRIEF SUMMARY OF THE INVENTION

The inventive method and system overcome the problems of the prior art by providing a message path configuration information container that defines a scope of resources to which the message path configuration information applies. The generic metadata container can be used to provide statements describing objects, as well as to refine previously made metadata statements, such as statement providing referral information for a message router. That is, the scope may refer to a range of message destinations, and the metadata statement may include a referral statement providing new routing information for the scoped range of original destinations. Using scoped referral metadata statements, a network node can delegate a portion of its own address space, or request that another node delegate a portion of its address space, to a different network node.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 1 illustrates conventional metadata in an HTML document.

FIG. 2 illustrates a general operating environment that may be used according to one or more illustrative aspects of the invention.

FIG. 3 illustrates a block diagram relating metadata to an object.

FIG. 10 illustrates a SOAP referral metadata element according to an illustrative embodiment of the invention.

FIG. 11 illustrates an initial message path according to an illustrative embodiment of the invention.

FIG. 12 illustrates a referral metadata element that inserts a node into the message page illustrated in FIG. 11.

FIG. 16 illustrates a referral metadata element that relates to another referral metadata element according to an illustrative embodiment of the invention.

FIG. 17 illustrates a referral metadata element query according to an illustrative embodiment of the invention.

FIG. 18 illustrates a referral metadata element query response according to an illustrative embodiment of the invention.

FIG. 19 illustrates a referral metadata element registration message according to an illustrative embodiment of the invention.

FIG. 20 illustrates a referral metadata element registration response message according to an illustrative embodiment of the invention.

FIG. 21 illustrates another referral metadata element registration response message according to an illustrative embodiment of the invention.

FIG. 22 illustrates a referral metadata element header according to an illustrative embodiment of the invention.

DETAILED DESCRIPTION OF THE INVENTION

Figures 4, 5:
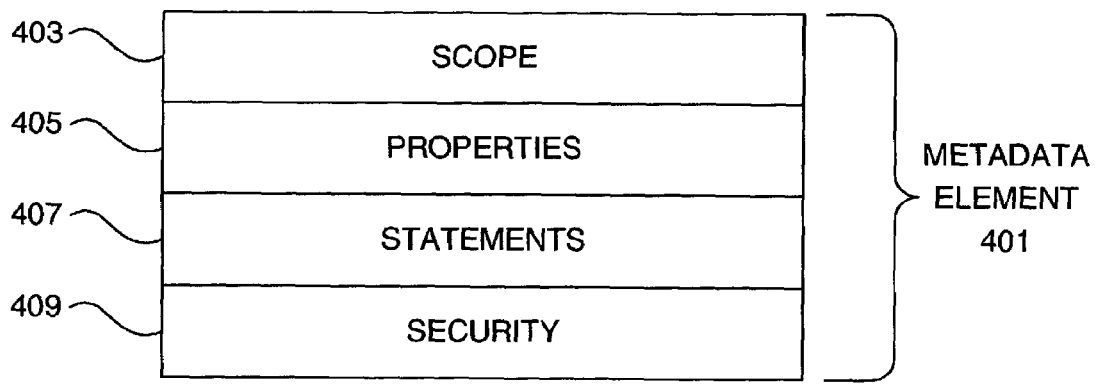
FIG. 4 illustrates a block diagram of metadata according to an illustrative embodiment of the invention.
FIG. 5 illustrates metadata described according to an illustrative embodiment of the invention.

According to one or more aspects of the invention, metadata is described using any protocol neutral communications mechanism, e.g., extensible Markup Language (XML), as further described below. FIG. 2 illustrates an example of a suitable computing system environment 100 on which the invention may be implemented in whole or in part. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

FIG. 3 illustrates a block relational diagram of an object and corresponding metadata. Broadly, an object 301 is described by various metadata elements 303, 305, 307, 309, 311. Each metadata element describes some aspect of object 301. Object 301 may be any computer or network object, such as a file, URL, URI, address, directory, web service, router, server, etc. Metadata elements 303, 305, 307, 309, 311 are used to describe features corresponding to object 301. Object 301 may alternatively be a conventional, non-computer object, such as a computer user (i.e., a person). Object 301 may alternatively be referred to herein as a resource or network resource.

For example, a web service 301 may be described by various metadata elements 303, 305, 307, 309, 311. Each metadata element may be communicated by the web service object 301 (or by a web service description service) to a requestor (not shown) to indicate how the requestor can communicate with the web service to receive information provided by the web service. Alternatively, object metadata might not be used by a requester, but instead may be used by the web service itself upon receipt from an authorized provider (e.g., providing updated policy metadata, access control metadata, etc.).

Suppose web service object 301 is a mailbox web service. Metadata element 303 may describe communication policies of web service 301, such as by indicating that web service 301 requires a Microsoft Passport ID, messages must be encrypted using triple-DES encryption, messages cannot exceed 1 MB in size, etc. Metadata element 305 may describe message routing information specific to the web service, e.g., indicating that messages intended for web service object 301 should be sent to a specified address or through a specified router or routers, as further described below.

Metadata element 307 may describe access information. That is, metadata may be used to describe who is authorized to access web service 301, such as only those users whose account is paid up to date. Access metadata may also include an access control list (ACL) defining who can access the mailbox web service. Metadata element 309 may describe transaction coordination information for communicating with web service 301, such as by indicating a transaction coordinator for web service 301, and/or other transaction information as described in copending application Ser. No. 10/211,299, filed Aug. 5, 2002, entitled "Coordinating Transactional Web Services."

Metadata element 311 may describe custom features specific to web service object 301, such as mailbox services provided (supported addresses, mail formats, mail protocols, confirmation of delivery, etc.), requirements for various services, and the like.

FIG. 4 illustrates a block diagram of a generic metadata element according to an illustrative aspect of the invention. Metedata element 401 may include a scope 403, one or more properties 405, one or more statements 407, and security information 409.

Scope 403 indicates an arbitrary universe of targets (i.e., the object or objects) to which metadata element 401 corresponds. For example, scope 403 may include a URI (http://www.Microsoft.com/), indicating that metadata element 401 describes any web page or web service located under that URI. Scope 403 may include a portion of a directory hierarchy (e.g., c:\root\users\jdoe\), indicating that metadata element 401 describes all files located at or below the specified subdirectory. Scope 403 can also refer to users or user identities, e.g., *@xyz.com, jdoe@xyz.com, "John Doe", etc. Scope 403 may also refer to a user based on biometric information, e.g., by including a digital representation of biometric information specific to the user, such as a fingerprint, thus indicating that the metadata element 401 describes the user with the fingerprint to which the digital biometric information corresponds.

Scope 403 may describe multiple objects using lists, ranges, or any known object description technique, and may describe the universe of targets in an additive (John Doe, but no one else) or subtractive (everyone but John Doe) manner, using declarative (scope ="John Doe"), programmatic (scope=run this Java applet), extensional (scope=John, Bill, Mary) and/or intesional (e.g., scope=The Jones Family, scope=John's mother's dog) descriptors. Scope 403 may describe the scope using arbitrarily complex relationships. Using the generic scope container, metadata element 401 can refer to virtually any object. For example, scope can refer to messages of a specified form, and further based on whether the current location is an intermediary node in a network or a terminal node of a data message. Scope 403 can also depend on whether messages are being sent from a location or to a location, and messages that contain specific information (e.g., the word "banana" in the message body). Scope can refer to messages that have been authenticated, and even to messages that have been authenticated using a specified technology (e.g., X509) or service (e.g., VeriSign), security token of a specific format as well as authority, strength of authentication, biometric data, smart card, or the like. Scope can also refer to the message in which the scope is being communicated (e.g., by message ID). One of skill in the art will appreciate that scope 403 can refer to any universe of targets that can be positively identified based on the data stored in scope 403.

Properties 405 describe properties of metadata element 401. That is, properties 405 may be thought of as metadata describing metadata element 401, such as name, author, expiration date/time, etc., of metadata element 401.

Each statement 407 provides some substantive metadata included in metadata element 401. Statements may be affirmatively recited (e.g., Max_Msg_Len=1024) or included by reference (e.g., Include IDREF="xx"), where the IDREF indicates a file or other object storing one or more metadata statements. Inclusion by reference may be used, for example, when multiple metadata elements need to ensure that identical statements are used. One of skill in the art will appreciate that any external reference may be used to include metadata statements, such as a URI, etc., and also that inclusion by reference may also be used for scope, properties, and security elements.

Security 409 describes security semantics and/or authentication measures to be applied to metadata element 401. For example, security 409 may include a digital signature to ensure that the metadata comes from a source authorized to promulgate the included or referenced metadata statements. One of skill in the art will appreciate that multiple scope, properties, statement, and/or security elements may be included in metadata element 401 as necessary, e.g., to include a scope with two mutually exclusive ranges making up the universe of targets. In addition, scopes, properties, statements, and security information may all be described using arbitrarily complex relationships using any combination of logical operands.

The generic metadata element 401 may be described in any protocol-neutral or platform-independent description language, such as XML, Java (or other Java-derived language), and the like. A metadata element described using XML may take a form similar to that illustrated in FIG. 5. One of skill in the art will appreciate that alternative syntax may be used without departing from the spirit and scope of the invention. For example, when the scope refers to a single object, a metadata element may omit the scope reference and instead include an attribute such as <Metadata about=" . . . "> . . . </Metadata>. Metadata statements as described herein may be sent as part of data messages, e.g., simple object access protocol (SOAP) messages, or may be included in web service description documents, such as WSDL documents.

Figure 6:
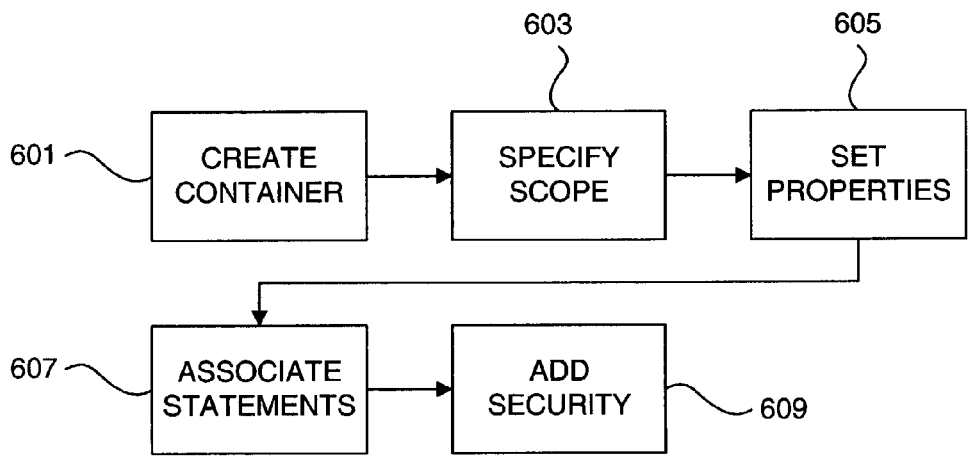
FIG. 6 illustrates a flowchart for creating a metadata container according to an illustrative embodiment of the invention.

FIG. 6 illustrates a flow chart for a method of creating a scoped metadata container according to an illustrative embodiment of the invention. In step 601 an empty container is created. In step 603, the scope is defined and stored in a scope section of the container or, alternatively, as an attribute. In step 605, properties are optionally set and stored in a properties section of the container. In step 607, metadata statements are associated with the container and stored in a statements section of the container. In step 609, security and authentication information is optionally stored in a security section of the container.

Figure 7:
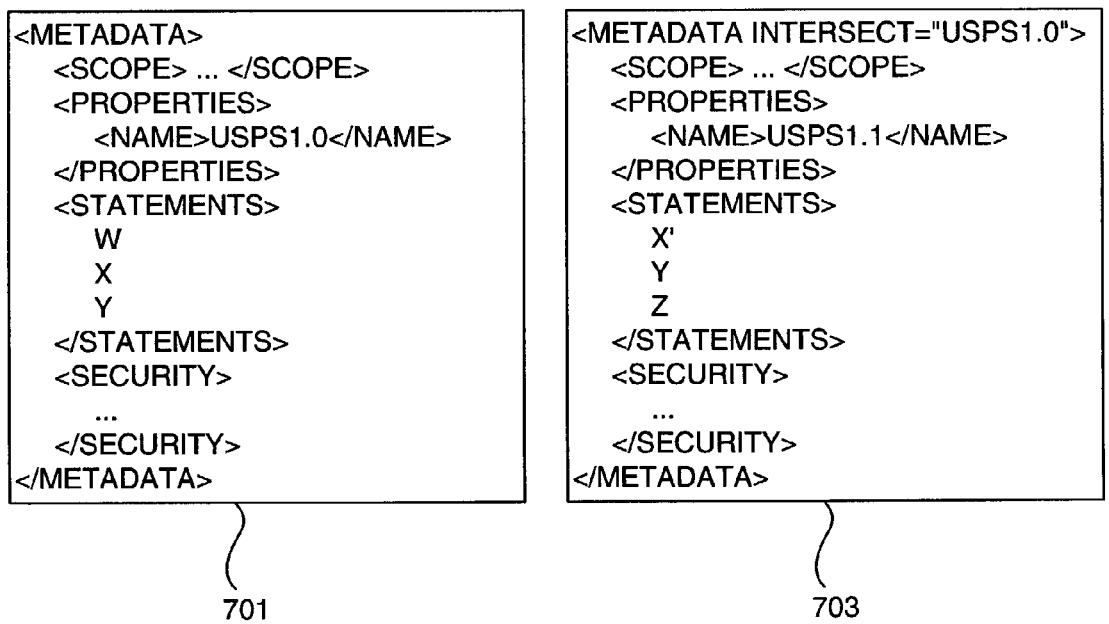
FIG. 7 illustrates a metadata refinement technique according to an illustrative embodiment of the invention.

According to another illustrative aspect of the invention, with reference to FIG. 7, one metadata element 703 may refine, replace, restrict, or intersect with another metadata element 701. For example, within a business organization, each division of the company may use standard division-wide metadata that is required to be included in all metadata elements (e.g., similar to using an "Include IDREF"-type statement) produced by that division. Likewise each department might require standard department-wide metadata included in metadata elements produced by that department, and the company as a whole may require standard company-wide metadata statements included in each metadata element produced by the company. If metadata statements conflict between two levels of the metadata hierarchy (e.g., company versus division), the invention provides a resolution mechanism to determine which statements, if any, remain in effect. For example, a division may include a metadata statement indicating that maximum message length is 1 MB. However, company-wide guidelines may require inclusion of another metadata statement that includes an indication that maximum message length can only be 512 KB. This may be resolved in various ways according to various aspects of the invention.

When two metadata elements refer to the same scope, one metadata element can merge with, replace, or intersect with another metadata element. When the statements of two metadata elements do not conflict, the two metadata elements may be merged together. When the statements do conflict, one metadata element may replace the other, or they may be intersected. During intersection, non-conflicting metadata statements are merged, while conflicting metadata statements are selected according to the most recent or superceding metadata element.

For example, as illustrated in FIG. 7, suppose metadata element 701 contains statements W, X, and Y, and suppose metadata element 703, which intersects with element 701, contains statements X', Y, and Z. An intersection of metadata elements 701 and 703 would contain statements W, X', Y, and Z. Other merge/intersection techniques may also be used as desired. In addition, a metadata element may also indicate that it cannot be replaced, for example, by including <Metadata Final="T"> . . . </Metadata> to indicate that that specific metadata element cannot be replaced or intersected with another metadata element. Those of skill in the art will appreciate that various metadata tags, or attributes, may be used to indicate the nature of the relationship between two metadata elements, e.g., invalidates, replaces, intersects, refines, merges, or the like.

According to another aspect of the invention, logical inferences or an inherent or natural hierarchy may be used to determine whether one metadata element supercedes another. For example, a metadata element with scope=http://www.foo.com/bar may automatically supercede another metadata element with scope=http://www.foo.com/.

Using metadata refinement and replacement, a web service can define default metadata for general services, and refine the default metadata for based on various service levels. For example, a default metadata element may indicate that Passport authentication must be used, but remain silent as to each user's maximum mailbox size. This default metadata can then be refined to indicate that the maximum mailbox size for users in the default "silver" service level is 1.5 MB. Another metadata element may refine the default metadata element and indicate, for messages authenticated as being from a "gold" service level member, the maximum mailbox size is 10 MB.

As indicated above, routing metadata may be used to convey information directed towards adding, updating, and querying routing information for an object (e.g., a web service), referred to herein as referral metadata. Referral metadata may be used to configure message path information in a network node. Prior to being able to effectively communicate with a web service, a requestor must learn where to send messages in order to contact the web service. That is, the requester must obtain the referral metadata associated with the web service in order to learn where to send messages to communicate with the web service. According to an illustrative aspect of the invention, a metadata type may optionally be included, e.g., <Metadata Type="referral"> . . . </Metadata> to indicate a class or type of metadata. One of skill in the art will appreciate that alternative syntax, as is known in the art, may be used to indicate a metadata type. For example, metadata statements may include a "type" indicator instead of placing the "type" indicator in the metadata element's header.

Figure 8:
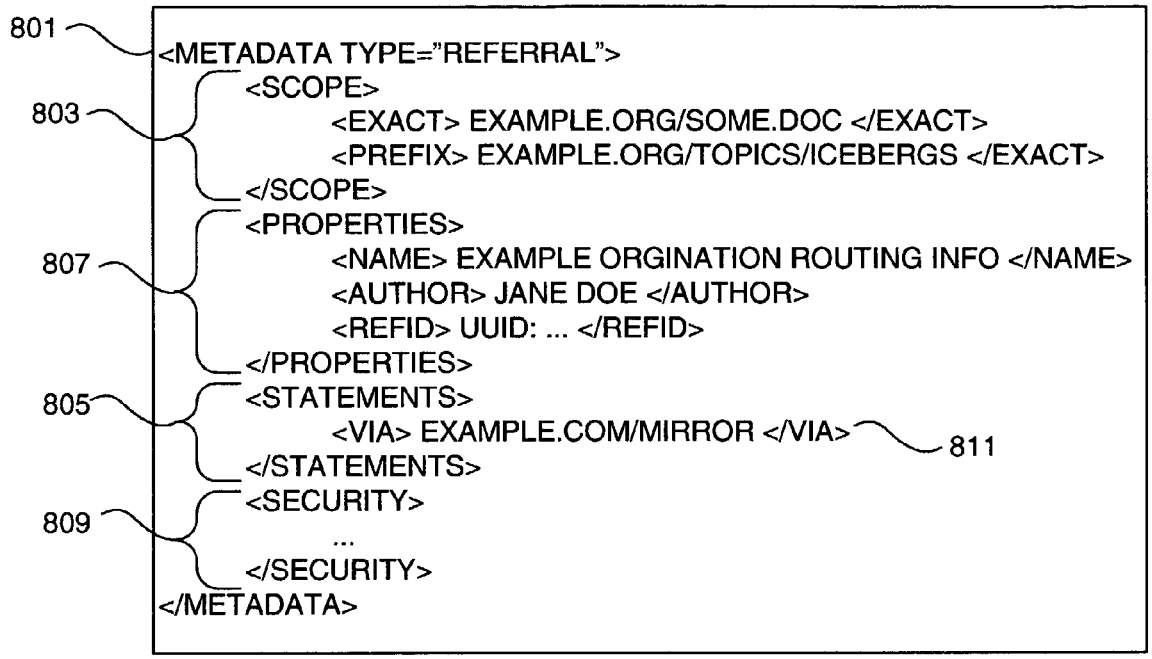
FIG. 8 illustrates a referral metadata element according to an illustrative embodiment of the invention.

FIG. 8 illustrates a modified scoped metadata element 801 adapted for use as a referral metadata element according to an illustrative aspect of the invention. The scope 803 indicates the range objects to which the referral metadata element applies. That is, the message path configuration information conveyed in the referral metadata element applies for messages directed to any object encompassed by the scope. As is illustrated in FIG. 8, the scope may be defined as one or more specific objects, or any object meeting certain criteria (e.g., having a certain prefix). One of skill in the art will appreciate that the scope can be defined in any manner such that a Boolean determination can be made as whether an object falls within the scope and that metadata attributes, or tags, may be renamed as applicable to make readability easier to a human user, without departing from use and functionality described herein.

Metadata statements 805 indicate the message handler to which messages can be sent in order to reach the object or objects encompassed by the scope. Each message handler may be a message intermediary (such as a router or a machine that substantively processes the message prior to delivery to the recipient) or a message recipient, collectively referred to as nodes. Metadata statement 805 may include one or more attributes 811 indicating a specific message handler to which the message can be directed. The 'exact' attribute (or similar) may be used to indicate nodes for which an exact match is needed, and may be expressed as a uniform resource identifier (URI). The 'prefix' attribute (or similar) may be used to indicate nodes for which a prefix match is needed. Optionally, referral metadata element may include properties 807 (e.g., name author, unique message ID, etc.) and security information 809, as described above.

According to an illustrative aspect of the invention, referral information may indicate a choice of acceptable referral options, e.g., by including multiple attributes 811 in the statements 805 of the metadata element 801. Optionally, an order of preference for each option may be provided. For example, a web service may provide two login servers. The web service may further indicate priorities for each server, e.g., that the first server should be used as a default, that second server should be used when the first server becomes unavailable or overloaded. The web service may optionally also specify requirements for each option. For example, if the first server is to be used, the message must contain an authentication token using the X.509 standard by the Internet Engineering Task Force (IETF). Logical operands or equivalents can be used (e.g., AND, NOT, OR, XOR, OPTIONAL, REQUIRED, etc.) to describe relationships, scopes, choices, and the like, or alternatively, individual attributes may be specified for each criterion.

Figure 9:
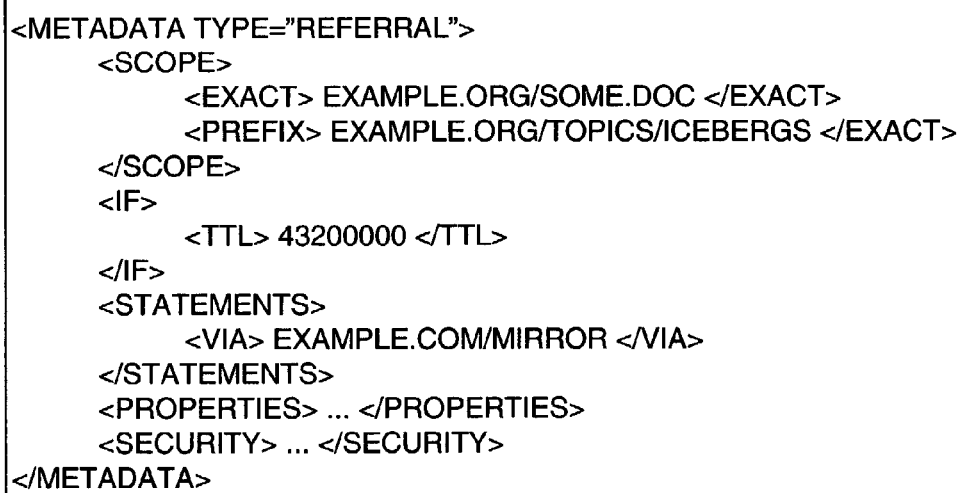
FIG. 9 illustrates a referral metadata element having a scope condition according to an illustrative embodiment of the invention.

According to another aspect of the invention, with reference to FIG. 9, conditions may be placed on referral metadata. As illustrated in FIG. 9, the referral metadata may be associated with a time-to-live (TTL), indicating that the referral metadata is only good for the specified period of time, which, in this example, is 43,200,000 milliseconds, or 12 hours. Other conditions may also or alternatively be included in each referral metadata element.

In an illustrative embodiment of the invention, the referral metadata elements may be stored in a header of a SOAP message, along with other headers that perform other unique functions (e.g., security, authentication, message routing), thus creating a composable message protocol such as is described in co-pending application Ser. No. 09/983,555 (filed Oct. 24, 2001). As illustrated in FIG. 10, the SOAP header may refer to a SOAP schema providing additional information to the recipient or an intermediary processing the message. FIG. 10 illustrates using SOAP the metadata generally illustrated in FIG. 9.

Figure 13:
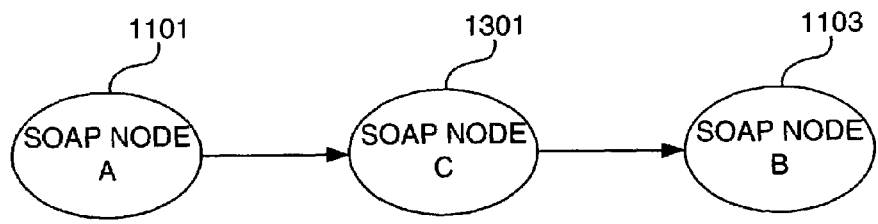
FIG. 13 illustrates a resultant message path subsequent to processing the metadata element illustrated in FIG. 12.

Thus, using the above described referral metadata, with reference to FIGS. 11-13, a node 1103 in a network can indicate to another node 1101 to insert a third node 1301 between the two nodes 1101, 1103 when communicating with each other. FIG. 11 illustrates an original message path between node 1101 and node 1103. FIG. 12 illustrates a SOAP embodiment of a referral metadata element indicating to node 1101 that messages intended for node 1103 should be sent via node 1301. FIG. 13 illustrates the resultant message path after node 1101 receives and processes the referral metadata element illustrated in FIG. 12. Such a referral metadata element can be used in cases where an intermediary is needed in order to facilitate communications between two other nodes.

Figure 14:
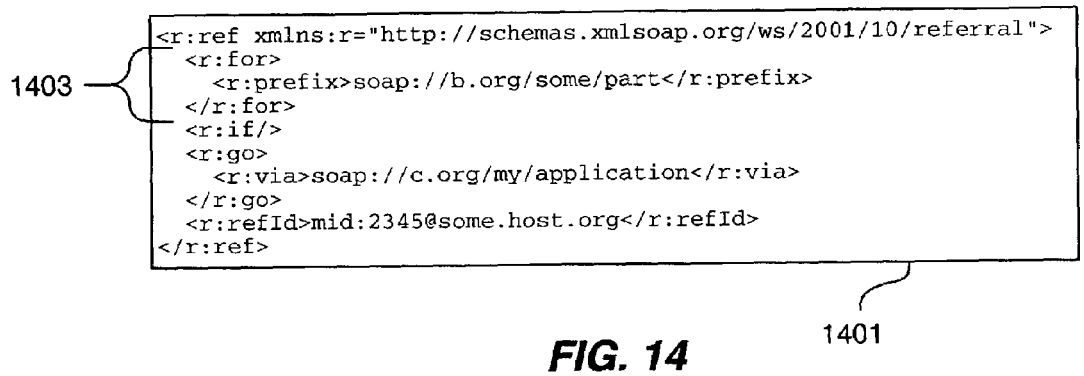
FIG. 14 illustrates a metadata element that adds a node at the end of the message path illustrated FIG. 11.
Figure 15:
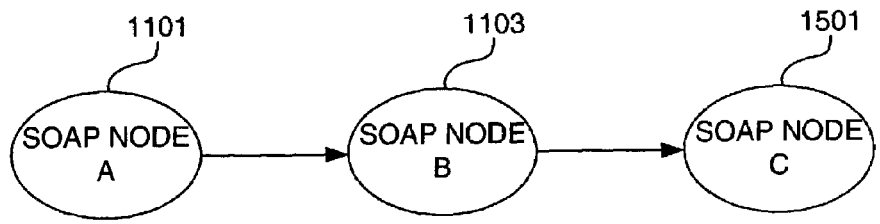
FIG. 15 illustrates a message path after processing the metadata element illustrated in FIG. 14.

In another example, with reference to FIGS. 11, 14 and 15, a referral metadata element can be used to insert a node 1501 after another node 1103. FIG. 15 illustrates a resultant message path after node 1101 (FIG. 11) receives and processes the referral metadata element illustrated in FIG. 14. The referral metadata element 1401 delegates a portion of the URI space of node 1103 so that messages intended for node 1103 are forwarded to node 1501 when the destination falls within the scope 1403. This type of delegation may be used to facilitate progressive discovery when node 1101 may not know that node 1103 has delegated part of its URI space to node 1501. This type of delegation may also be used when node 1101 has the authority to delegate a portion of the URI space of node 1103 to node 1501. After node 1103 accepts referral metadata element 1401, node 1103 will forward subsequent messages intended for any recipient with the appropriate prefix (i.e., "soap://b.org/some/part") to node 1501. Other SOAP headers, as part of a composable protocol, may provide necessary authentication and security measures to inform node 1103 to accept referral metadata element 1401 (discussed above, briefly).

In another example, with reference to FIG. 16, a referral metadata element may be used to invalidate a previous referral metadata element (or a portion thereof, e.g., a single statement). Metadata element 1601 invalidates metadata element 1401 (FIG. 14), as indicated by the relationship attribute 'invalidates' and the message ID corresponding to the metadata element to be invalidated (in this example, metadata element 1401). After processing metadata element 1601, node 1501 (FIG. 15) is no longer delegated a portion of the URI space of node 1103.

With reference to FIGS. 17-18, another aspect of the invention provides a query mechanism so that a node can obtain/update its own routing information based on another node's routing information. FIG. 17 illustrates a portion of a message including a referral metadata query 1701 requesting referral information with respect to a range as defined in a 'for' scope. FIG. 18 illustrates a portion of a message including a referral metadata query response 1801 providing the information requested by query 1701.

According to another aspect of the invention, a node can explicitly request that another node accept or reject a referral metadata element. This can be used, for example, to explicitly request that a node delegate a piece of its URI space to another node. The request may be sent in the form of a registration message, with the response returned in a registration response message. FIG. 19 illustrates a registration request message 1901, requesting that the node located at soap://b.org delegate a portion of its URI space to the node located at soap://c.org, and more specifically to an application program residing at soap://c.org/my/application. The node located at soap://b.org may accept or reject the request by sending an appropriate registration response message.

According to one illustrative embodiment, a node accepts a registration request by simply returning an acknowledgement message 2001, as illustrated in FIG. 20, and rejects the request by returning a fault message 2101, illustrated in FIG. 21, including a fault code 2103. The fault code provides a reason that the request was rejected, for example, the node to which the registration was requested only accepts a specific max time-to-live (TTL) value for referral metadata statement. The fault code 'duplicate' or similar may be used when a node already has accepted and processed a valid referral metadata with the same message ID value. The fault code 'notInvalidated' or similar may be used when a node refuses to invalidate an accepted valid referral metadata statement. The refusing node may also indicate offending message ID values as part of the 'notInvalidated' code. Other fault codes and reasons may also or alternatively be used.

While some of the examples included herein, such as those illustrated in FIGS. 19-21, include referral metadata in a body portion of a message, in an alternative illustrative embodiment the referral metadata information may be communicated in a header portion 2203 of a message 2201, as illustrated in FIG. 22, so that the referral information can be piggybacked in a message with other information, as appropriate. In some embodiments, all identifiers are expressed in the form of a URI without exception. In other embodiments, alternative forms of identifiers may be used.

While the invention has been described with respect to specific examples including presently preferred modes of carrying out the invention, such as using SOAP XML, those skilled in the art will appreciate that there are numerous variations and permutations of the above described systems and techniques, such as using other platform-independent mechanisms such as Java or a Java-based language. Thus, the spirit and scope of the invention should be construed in view of the appended claims.

We claim:

1. One or more tangible computer readable media storing a data structure describing referral data used in routing messages in a simple object access protocol (SOAP) environment, said data structure comprising:

a first data field containing at least one referral statement which includes information pertaining to one or more additional nodes in the SOAP environment to use in redirecting messages originally intended for a first node encompassed by a range of nodes to said one or more additional nodes; and a second data field containing a referral scope that defines a range of messages subject to redirecting provided in the at least one referral statement.

2. The computer readable media of claim 1, further comprising a third data field containing at least one property corresponding to the at least one referral statement.

3. The computer readable media of claim 2, wherein the third data field comprises a message ID.

4. The computer readable media of claim 1, further comprising a third data field containing security data corresponding to the at least one referral statement.

5. The computer readable media of claim 1, wherein the referral scope comprises a destination prefix.

6. The computer readable media of claim 1, wherein the referral scope comprises an exact destination.

7. The computer readable media of claim 6, wherein the referral scope encompasses a web service.

8. The computer readable media of claim 1, wherein the referral scope encompasses a network service.

9. The computer readable media of claim 1, wherein the referral scope encompasses a human user.

10. The computer readable media of claim 9, wherein the referral scope comprises biometric information corresponding to the user.

11. The computer readable media of claim 1, wherein the referral scope encompasses an automated user.

12. The computer readable media of claim 11, wherein the referral scope encompasses an application program.

13. The computer readable media of claim 1, wherein the referral scope encompasses messages having predetermined content.

14. The computer readable media of claim 1, wherein the referral scope comprises a uniform resource identifier (URI).

15. The computer readable media of claim 1, further comprising a third data field functioning to indicate that the data structure relates to a separately communicated referral statement.

16. The computer readable media of claim 15, wherein the third data field indicates that the data structure invalidates the separately communicated referral statement.

17. The computer readable media of claim 1, further comprising a third data field containing a condition which must be met in order for the at least one referral statement to be applied.

18. The computer readable media of claim 17, wherein the condition comprises a maximum time to live (TTL) value.

19. The computer readable media of claim 1, wherein the data structure serves to delegate a portion of an address space of a web service.

20. The computer readable media of claim 1, further comprising a third data field functioning to request the at least one referral statement be registered by a recipient of the data structure.

21. A method for registering a referral statement at a network node, comprising:
   (a) receiving a registration request message comprising a range of message destinations and a corresponding referral statement, wherein the registration request message comprises simple object access protocol (SOAP) expressed information generated at an application layer, and
   wherein the referral statement includes information pertaining to one or more additional nodes in the SOAP environment to use in redirecting messages originally intended for a first node encompassed by the range of message nodes to said one or more additional nodes and wherein the range is expressed as a uniform resource identifier (URI); and
   (b) updating a router table based on the received referral statement.

22. One or more tangible computer readable media storing computer executable instructions for performing a method comprising steps of
   (a) receiving an electronic registration request message comprising a range of message destinations and a corresponding referral statement,
   wherein the registration request message comprises simple object access protocol (SOAP) expressed information generated at an application layer, the referral statement includes information pertaining to one or more additional nodes in the SOAP environment to use in redirecting messages, and indicating that the receiving device is to redirect messages originally intended for a first node encompassed within the range of message nodes to said one or more additional nodes; and
   (b) updating a router table based on the received electronic registration request.

23. A method for communicating routing information with network nodes that route object access messages conforming to an object access protocol, where the object access protocol is XML-based and the object access messages are transported by messages of an application-layer protocol, the method comprising:
   receiving via a network a referral message, the referral message comprising:
      information specifying one or more objects that are accessible via the network using the object access protocol;
      information identifying a network node for routing object access messages that conform to the object access protocol; and
   receiving object access messages conforming to the object access protocol and handling the messages by:
      determining whether an object access message is addressed to the one or more objects specified by the referral message, and when so determined, forwarding the object access message to the network node specified in the referral message so that the network node can route the object access message over the network to the one or more objects.

24. A method according to claim 23, wherein the application-layer protocol comprises a hypertext transfer protocol.

25. A method according to claim 23, wherein the object access protocol comprises a Simple Object Access Protocol (SOAP).

26. A method according to claim 23, wherein the information specifying the one or more objects comprises a URI.

27. A method according to claim 23, wherein the referral message further comprises condition information, and the handling the received object access messages further comprises determining whether the object access message satisfies the condition described in the referral message and the forwarding the object access message to the network node specified in the referral message occurs when so determined and when the object access message is addressed to the one or more objects specified by the referral message.

* * * * *